US012361076B2

(12) United States Patent
Eggleston et al.

(10) Patent No.: US 12,361,076 B2
(45) Date of Patent: Jul. 15, 2025

(54) METHOD AND SYSTEM FOR AUTHORIZING AND ENABLING ANONYMOUS CONSUMER INTERNET PERSONALIZATION

(71) Applicant: Semantic Labs, LLC, Baltimore, MD (US)

(72) Inventors: York Eggleston, Baltimore, MD (US); Llewellyn Wall, Arlington, VA (US)

(73) Assignee: Semantic Labs, LLC, Baltimore, MD (US)

( * ) Notice: Subject to any disclaimer, the term of this patent is extended or adjusted under 35 U.S.C. 154(b) by 0 days.

(21) Appl. No.: 16/160,508

(22) Filed: Oct. 15, 2018

(65) Prior Publication Data
US 2019/0057162 A1    Feb. 21, 2019

Related U.S. Application Data

(62) Division of application No. 15/286,263, filed on Oct. 5, 2016, now abandoned, which is a division of
(Continued)

(51) Int. Cl.
*G06F 16/9535*    (2019.01)
*G06Q 30/0207*    (2023.01)
(Continued)

(52) U.S. Cl.
CPC ..... *G06F 16/9535* (2019.01); *G06Q 30/0236* (2013.01); *G06Q 30/0269* (2013.01); *G06Q 30/0631* (2013.01)

(58) Field of Classification Search
None
See application file for complete search history.

(56) References Cited

U.S. PATENT DOCUMENTS

2010/0161492 A1 * 6/2010 Harvey .............. G06Q 30/0246
                                                                    705/50
2011/0022681 A1 * 1/2011 Simeonov ............... H04L 67/10
                                                                    709/217
(Continued)

FOREIGN PATENT DOCUMENTS

CA           2762967 A1 *  11/2010  ........... G06F 16/335
WO   WO-2008130736 A1 *  10/2008  ........... G06F 16/248

OTHER PUBLICATIONS

Author(a): Tene, Omar . Title: Big data for all. Journal: Northwest Journal of Tech [online]. Publication date:2013 .[retrieved on: Apr. 28, 2022_ ]. Retrieved from the Internet: <URL: https://heinonline.org/HOL/Page?handle=hein.journals/nwteintp11&div=20&g_sent=1&casa_token=&collection=journals> (Year: 2013).*
(Continued)

*Primary Examiner* — Kambiz Abdi
*Assistant Examiner* — Alfred H Tsui
(74) *Attorney, Agent, or Firm* — Sughrue Mion, PLLC

(57) ABSTRACT

A system and method for customizing information presented to a user based on user preferences and/or interests. The system receives user preferences and/or interests and builds a user profile for the user based on those preferences and/or interests. The system receives a request from a website or application to access the user's profile. In response to this request, the system provides the website or application with access to the user's profile and generates one or more customized content items based on the user's profile, which may be embedded into, overlaid on the website or graphical user interface of the application. The system also allows the user to personalize their profile to generate customized content items on websites and applications that the user visits or uses.

7 Claims, 9 Drawing Sheets

Related U.S. Application Data application No. 14/562,367, filed on Dec. 5, 2014, now abandoned.

(60) Provisional application No. 61/963,658, filed on Dec. 10, 2013.

(51) Int. Cl.
  *G06Q 30/0251* (2023.01)
  *G06Q 30/0601* (2023.01)

(56) References Cited

U.S. PATENT DOCUMENTS

| | | | | |
|---|---|---|---|---|
| 2012/0047565 | A1* | 2/2012 | Petersen | G06Q 50/01 726/7 |
| 2013/0041688 | A1* | 2/2013 | Vovan | G06Q 30/0217 705/3 |
| 2014/0032259 | A1* | 1/2014 | LaFever | G06Q 50/265 705/7.29 |
| 2014/0136997 | A1* | 5/2014 | Spivack | H04L 65/403 715/753 |

OTHER PUBLICATIONS

Author(s): Min Tun Title: Privacy vs reward Journal: Elsevier [online]. Publication date:2015 .[retrieved on: _Sep. 10, 2022_]. Retrieved from the Internet: <URL: https://www.sciencedirect.com/science/article/pii/S0969698915000065 > (Year: 2015).*

Author(s): Steindel, Tracy Title: A path towards user control of online profiling Journal: HEIN Online[online]. Pub date:2015.[ retrieved on:Mar. 17, 2023 ]. Internet: <URL: https://heinonline.org/HOL/Page?handle=hein.journals/mttlr17&div=16&g_sent=1&casa_token=&collection=journals > (Year: 2011).*

Author(s): Riederer, C Title: For sale: your data: by : you Journal:ACM[online]. Pub date:2011 .[retrieved on:May 2, 2024]. Internet: <URL: https://dl.acm.org/doi/abs/10.1145/2070562.2070575> (Year: 2011).*

Author(s): Messina, C Title: Groups for twitter, a proposal for twitter tag channels Journal: Factory joe [online]. Pub date:2007 .[ retrieved on:May 3, 2024]. Internet: <URL: https://factoryjoe.com/2007/08/25/groups-for-twitter-or-a-proposal-for-twitter-tag-channels/> (Year: 2007).*

Author(s): Premazzi Title: Customer information sharing with E-Vendors Journal:Taylor Francis[online]. Pub date:2010.[ retrieved on: Nov. 1, 2024]. Internet: <URL: https://www.tandfonline.com/doi/abs/10.2753/JEC1086-4415140304> (Year: 2010).*

Author(s): Solove, D Title: Privacy self-management and the consent dilemma Journal: HEINOnline [online]. Publication date : 2012. [retrieved on: Mar. 7, 2025]. Retrieved from the Internet: <URL: https://heinonline.org/HOL/Page?collection=journals&handle=hein.journals/hlr126&id=1910&men_tab=srchresults> (Year: 2012).*

\* cited by examiner

METHOD AND SYSTEM FOR AUTHORIZING AND ENABLING ANONYMOUS CONSUMER INTERNET PERSONALIZATION

CROSS-REFERENCE TO RELATED APPLICATIONS

This application is a divisional application of U.S. patent application Ser. No. 15/286,263, filed Oct. 5, 2016, which is a divisional application of U.S. patent application Ser. No. 14/562,367, filed Dec. 5, 2014, entitled "Method and System for Authorizing and Enabling Anonymous Consumer Internet Personalization," which claims the benefit of U.S. Provisional Patent Application No. 61/963,658, filed Dec. 10, 2013, entitled, "Method and System for Authorizing and Enabling Anonymous Consumer Internet Personalization," which are incorporated herein by reference in their entireties. This application is related to, but does not claim priority from U.S. patent application Ser. No. 14/476,800, filed on Sep. 4, 2014, and entitled "Systems and Methods of Publishing Content From One or More Sources," which is hereby incorporated herein by reference in its entirety.

BACKGROUND

Some websites continuously collect data about users that visit the site. Current systems and methods of collecting data rely on aggregate filtering techniques. However, users want privacy while visiting websites on the Internet, or at the very least they want to control which sites collect data associated with the user. These users also want websites to provide information that is of interest to them.

Various embodiments of the present systems and methods recognize and address the foregoing considerations, and others, of prior art systems and methods.

SUMMARY OF THE VARIOUS EMBODIMENTS

In general, in various embodiments, a computer-implemented method of customizing information presented to a user comprises receiving, by a processor, information about a user's preferences. The processor builds a profile for the user based on the received information. In particular embodiments, the processor receives a request from one of a first website and a first application to access the user's profile. At least partially in response to receiving the request from the one of the first website and the first application, the processor provides the one of the first website and the first application access to the user's profile. The processor also generates one or more customized content items based on the user's profile that are configured to be integrated into the one of the first website and the first application.

In other embodiments, a computer-implemented method of customizing information presented to a user comprises receiving, by a processor, information about a user's preferences, wherein the user's preferences are obtained by tracking the user's activities on at least one of the website and application. The processor builds a profile for the user based on the received information. The method further comprises receiving, by a processor, a request from one of a first website and a first application to access the user's profile and at least another user's profile. At least partially in response to receiving the request from the one of the first website and the first application, the processor provides access to the user's profile and the at least another user's profile. The method further comprises generating, by a processor, one or more customized content items presented on the one of the first website and the first application based on the user's profile and the at least another user's profile.

BRIEF DESCRIPTION OF THE DRAWINGS

Various embodiments of systems and methods for customizing information presented to a user are described below. In the course of this description, reference will be made to the accompanying drawings, which are not necessarily drawn to scale and wherein.

DETAILED DESCRIPTION OF SOME EMBODIMENTS

Figure 1:
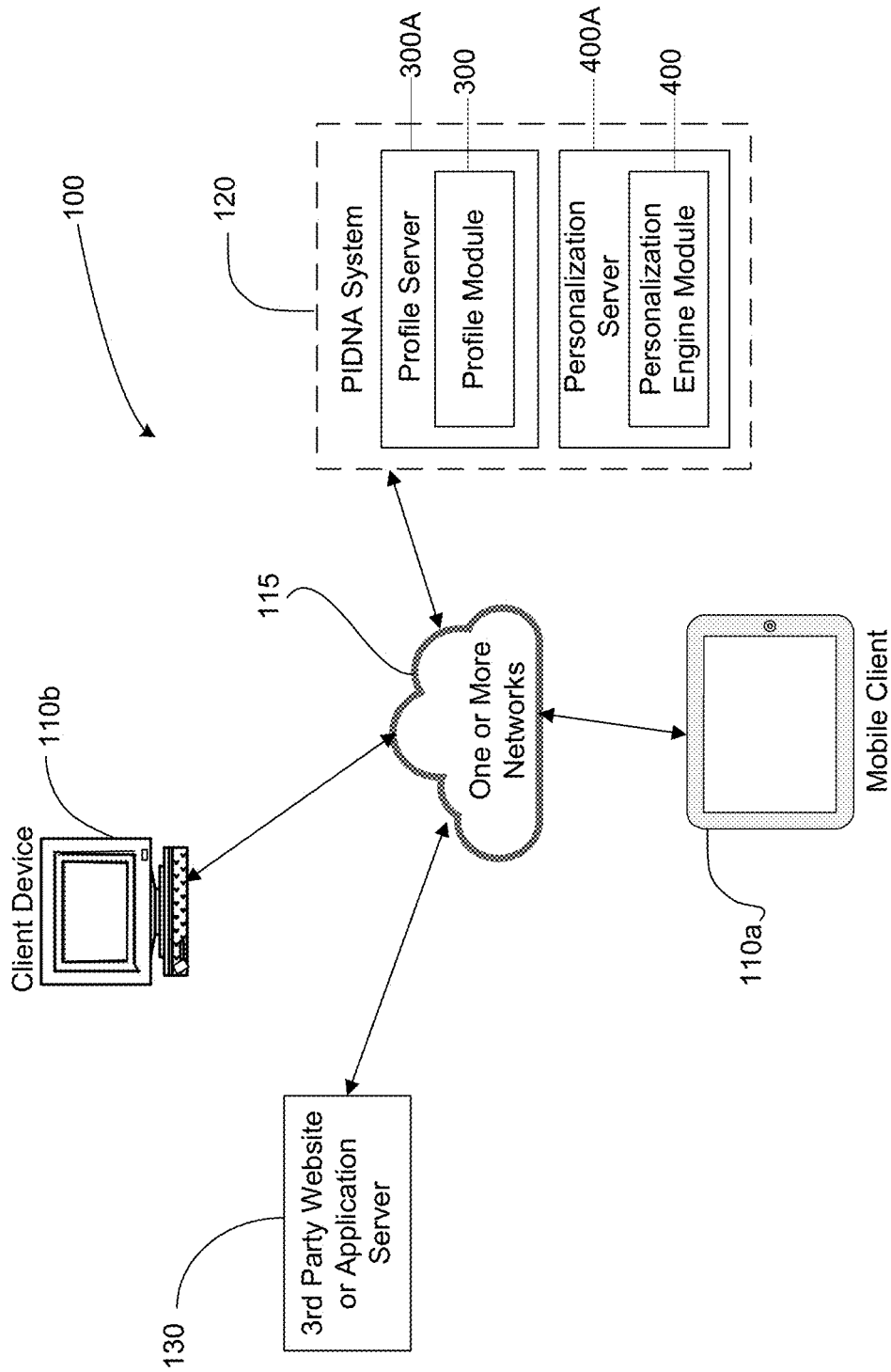
FIG. 1 is a block diagram of a profile of interest DNA (hereinafter "PIDNA") system in accordance with an embodiment of the present system.

Various embodiments will now be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

A system and method, according to various embodiments, for building a Profile of Interest DNA (e.g., a PIDNA profile or user profile) for a user and presenting customized information to the user based on the PIDNA profile, which contains at least a profile module and a personalization module. The Profile of Interest DNA may differentiate one user from another in the same way that DNA from the first user is different from the DNA of the other user. However, the Profile of Interest DNA is not genetic-based, but rather interest-based, preference based and/or demographic based. Thus, similar to how DNA defines the genetics of a living organism, the Profile of Interest DNA defines the interests, demographics, and/or behavior of a user. The PIDNA system allows the user to anonymously create, own, and manage their PIDNA profile and to determine which companies or providers of information gain access to the user's PIDNA profile. The system also allows small companies to gain a more equal footing in reaching consumers based on using users' PIDNA profiles since the information collected in the profile and access to the profile is controlled by the user and not large data collection companies or by large companies colleting and aggregating personal data across multiple owned properties. This invention allows smaller firms to provide personalized services on par with the large companies by allowing the user to manage and share personal information with companies that is useful in providing the products or services which the consumer prefers and in the context in which they desire it.

Initially, the user establishes an account with the PIDNA system. Once the user logs into their account, the system may generate the user's PIDNA profile by one or more of (1) scanning a user's social media accounts for areas of interest, (2) allowing the user to build their profile by selecting areas of interest, and (3) tracking a user's patterns when the user surf s the internet through the users use of mobile applications, or directly from the user when the user uses a PIDNA application that can be run on a handheld computing device or on a desktop computing device. For example, when the user logs into their account using the PIDNA application for the first time, the system may request that the user link one or more social media sites to the user's PIDNA account. Once these accounts are linked to the user's PIDNA account, the profile module scans the linked social media accounts and searches for user preferences related to one or more areas of interest. The PIDNA system may initially generate the user's PIDNA profile based on the one or more areas of interest found in the user's social media accounts (e.g., FACEBOOK®, MYSPACE®, TWITTER®, LINKEDIN®, URBANSPOON®, etc.), email, or commerce sites that are interest-based rather than demographically-based. The one or more areas of interests may be related to one or more topics including, but not limited to, entertainment, news, sports, lifestyle, money, finance, weather, autos, homes, dating, jobs, shopping, health, style, beauty, food, movies, travel, business, technology, science, etc.

After receiving the user's preferences, the system may also request that the user review one or more categories of information and manually select those areas that are of interest to the user. This may be done in addition to scanning the user's social media account or instead of scanning the user's social media accounts. Finally, once a PIDNA profile has been established, the system may be configured to track the user's activities on one or more websites, mobile applications, or through the PIDNA application to further develop the user's PIDNA profile. Thus, the PIDNA profile is not a static database since it is continually being updated as additional usage and behavior history of the user is collected by the PIDNA system over time.

In various embodiments, the PIDNA profile may be graphically displayed to the user in a graphical visualization that represents the user's degree of interest in each topic. In various embodiments, the graphical visualization may be formed from a series of sub-bars that represent one of many areas of interest where the length of each sub-bar is proportional to the user's interest in the particular topic associated with that sub-bar. For instance, where the user is more interested in sports than news, the sports sub-bar of the graphical visualization will be larger than the news sub-bar. In some embodiments, the sub-bar may be color coded by topic of interest. For instance, the sub-bar may display sports in orange and news in blue. In other embodiments, the graphical visualization may be displayed as any suitable shape. For example, the graphical visualization may be a bar with the series of sub-bars aligned horizontally to each other. In other embodiments, the graphical representation may be a pie chart or a series of rings where each ring represents a different topic and the radial width of a ring represents greater interest in the topic associated with the ring. The graphical visualization may be embedded on any page displayed to the user in a web browser, it may be embedded in the graphical user interface for a mobile application, or it may be embedded in the graphical user interface for the PIDNA application.

The system continues to refine the PIDNA profile using updated information manually received from the user or based on the user's activities on a web browser or through their interactions on mobile applications. That is, as the user surf's the internet or uses mobile applications (e.g., Amazon's mobile application, Best Buys' mobile application, etc.) to read articles, research or purchase products, or participate in specific online activities, the system collects the information to further develop and refine the user's PIDNA profile.

The PIDNA system may use the user's PIDNA profile to generate customized content for the user. For instance, a personalization module may select and display customized content (e.g., articles on a webpage, product and service recommendations, offers, coupons, suggestions to connect with other users having similar PIDNA profiles, recommendations for events or activities, search suggestions, filtered TWITTER® feeds, etc.) that is tailored to the user's interests based on the user's PIDNA profile. For example, the system may use the PIDNA profile of a user to filter TWITTER® feeds so that the user only views comments from those users who have similar PIDNA profiles (e.g., exactly the same profiles, profiles where 70% of the interests are the same, etc.). In various embodiments, the system may receive a request from the user to turn the personalization module (1) on or off, in general, (2) on or off for a particular site or application, or (3) to manual where access to the user's PIDNA profile is requested for each site or application. In any case, when a website or application requests access to a user's PIDNA profile, the website or application uses the PIDNA profile to customize the information presented. In order for the personalization module to select appropriate content, the personalization module may use aggregate filtering, rule based filtering, generic algorithm based filtering, neural network based models, etc. to generate customized content, including commerce, software or people recommendations, to the user.

The system, according to various embodiments, is configured to receive a request from a website or application that uses the PIDNA system to access a profile for a user that is surfing the website or using the application. In some embodiments, the user may configure the PIDNA system to automatically make suggestions for every website or application. In other embodiments, the user may configure the PIDNA system to request access to the user's PIDNA profile, which the user can manually allow. If the request is approved (e.g., manually or automatically), the personalization engine accesses the user's PIDNA profile and uses the profile information to customize content presented on the website or application. In particular embodiments, the user may exclude certain types of websites or applications from accessing the user's PIDNA profile. The user may also exclude websites or applications from accessing certain aspects of the user's PIDNA profile. For instance, the user may exclude advertising companies from accessing the user's PIDNA profile related to the user's shopping interests.

In various embodiments, when two or more users, each having a PIDNA profile, want to find areas of common interest to both users, the system may be configured to receive a request from multiple user's where the two or more user PIDNA profiles are used by the website or application to search for an area of interest that is common to the two or more users. This may occur when one user is seeking to connect with another user using a particular website and the website wants to match the users according to their interests. Another example is where two friends are searching for a restaurant using a website or an application (e.g., OPENTABLE®). In this case, the users can submit their PIDNA profiles to the website or application to search for a restaurant that matches the users' common interests.

Exemplary Technical Platforms

As will be appreciated by one skilled in the relevant field, the present systems and methods may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagram and flowchart illustrations of methods, apparatuses, (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus that can direct a computer or other programmable data processing apparatus to function in a particular manner such that the instructions stored in the computer-readable memory produce an article of manufacture that is configured for implementing the functions specified in the flowchart block or blocks.

The computer instructions may execute entirely on the user's computer, partly on the user's computer, as a stand-alone software package, partly on a user's computer and partly on a remote computer, or entirely on the remote computer or server. In the latter scenario, the remote computer may be connected to the user's computer through any type of network, including but not limited to: a local area network (LAN); a wide area network (WAN); a cellular network; or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer-implemented process (e.g., method) such that the instructions that execute on the computer or other programmable apparatus provide steps for implementing the functions specified in the flowchart block or blocks.

Example System Architecture

FIG. 1 is a block diagram of a System 100 according to particular embodiments. As may be understood from this figure, the System 100 includes One or More Networks 115, One or More Computing Devices 110a, 110b (e.g., such as a smart phone, a tablet computer, a wearable computing device, a laptop computer, a desktop computer, etc.), a PIDNA system 120 that includes a Profile Server 300A and a Personalization Server 400A, and one or more Third-Party Website Servers and/or Application Servers 130. In other particular embodiments, the PIDNA System 120 may include only the Profile Server 300A having a profile module 300 thereon, and the Personalization Module 400 is owned by a third party. It should be understood that in various embodiments, the Profile Module 300 and the Personalization Engine Module 400 may be collocated on a single server.

The One or More Networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computing devices). The communication link between the One or More Computing Devices 110a, 110b and the PIDNA System 120 may be, for example, implemented via a Local Area Network (LAN) or via the Internet.

Figure 2:
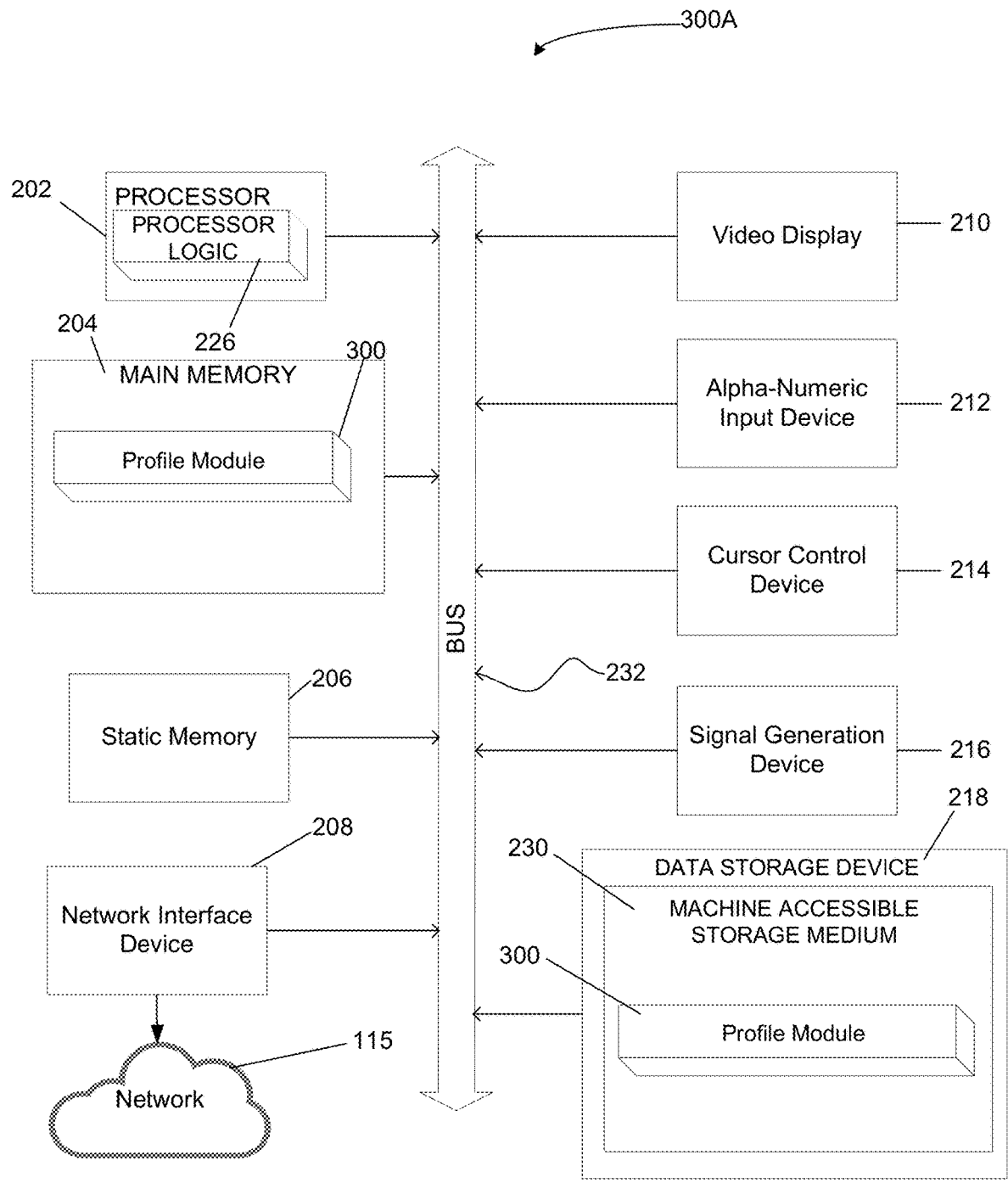
FIG. 2 is a schematic diagram of a computer, such as the PIDNA server of FIG. 1, that is suitable for use in various embodiments.

FIG. 2 illustrates a diagrammatic representation of the architecture for the Profile Server 300A that may be used within the system 100. It should be understood that the computer architecture shown in FIG. 2 may also represent the computer architecture for any one of the One or More Computing Devices 110a, 110b and one or more Third-Party Website Servers and/or Application Servers 130 shown in FIG. 1. In particular embodiments, the Profile Server 300A may be suitable for use as a computer within the context of the PIDNA System 120 that is configured for receiving information about a user's preferences, building a profile for the user, receiving a request from a website to access the user's profile, providing access to the user's profile to the website, and generating a customized content item based on the user's profile.

In particular embodiments, the PIDNA Server 300A may be connected (e.g., networked) to other computing devices in a LAN, an intranet, an extranet, and/or the Internet as shown in FIG. 1. As noted above, the PIDNA Server 300A may operate in the capacity of a server or a client computing device in a client-server network environment, or as a peer computing device in a peer-to-peer (or distributed) network environment. The PIDNA Server 300A may be a desktop personal computing device (PC), a tablet PC, a set-top box (STB), a Personal Digital Assistant (PDA), a cellular telephone, a web appliance, a network router, a switch or bridge, or any other computing device capable of executing a set of instructions (sequential or otherwise) that specify actions to be taken by that computing device. Further, while only a single computing device is illustrated, the term "computing device" shall also be interpreted to include any collection of computing devices that individually or jointly execute a set (or multiple sets) of instructions to perform any one or more of the methodologies discussed herein.

An exemplary PIDNA Server 300A includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose or specific processing devices such as a microprocessor, a central processing unit (CPU), or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The PIDNA Server 300A may further include a network interface device 208. The PIDNA Server 300A may also include a video display unit 210 (e.g., a liquid crystal display (LCD) or a cathode ray tube (CRT)), an alpha-numeric input device 212 (e.g., a keyboard), a cursor control device 214 (e.g., a mouse), and a signal generation device 216 (e.g., a speaker).

The data storage device 218 may include a non-transitory computing device-accessible storage medium 230 (also known as a non-transitory computing device-readable storage medium or a non-transitory computing device-readable medium) on which is stored one or more sets of instructions (e.g., the Profile Module 300) embodying any one or more of the methodologies or functions described herein. The Profile Module 300 may also reside, completely or at least partially, within the main memory 204 and/or within the processing device 202 during execution thereof by the PIDNA Server 300A—the main memory 204 and the processing device 202 also constituting computing device-accessible storage media. The Profile Module 300 may further be transmitted or received over a network 115 via a network interface device 208.

While the computing device-accessible storage medium 230 is shown in an exemplary embodiment to be a single medium, the term "computing device-accessible storage medium" should be understood to include a single medium or multiple media (e.g., a centralized or distributed database, and/or associated caches and servers) that store the one or more sets of instructions. The term "computing device-accessible storage medium" should also be understood to include any medium that is capable of storing, encoding, or carrying a set of instructions for execution by the computing device and that causes the computing device to include any one or more of the methodologies of the present invention. The term "computing device-accessible storage medium" should accordingly be understood to include, but not be limited to, solid-state memories, optical and magnetic media, etc.

Exemplary System Platform

As noted above, a system, according to various embodiments, is adapted to receive a user's preferences, build a user profile, receive a website request for access to the user's profile, provide access to the user's profile, and generate a customized content item based on the user's profile.

Various aspects of the system's functionality may be executed by certain system modules, including the Profile Module 300 and the Personalization Engine Module 400.

The Profile Module 300 and the Personalization Engine Module 400 are discussed in greater detail below.

Profile Module

Figure 3:
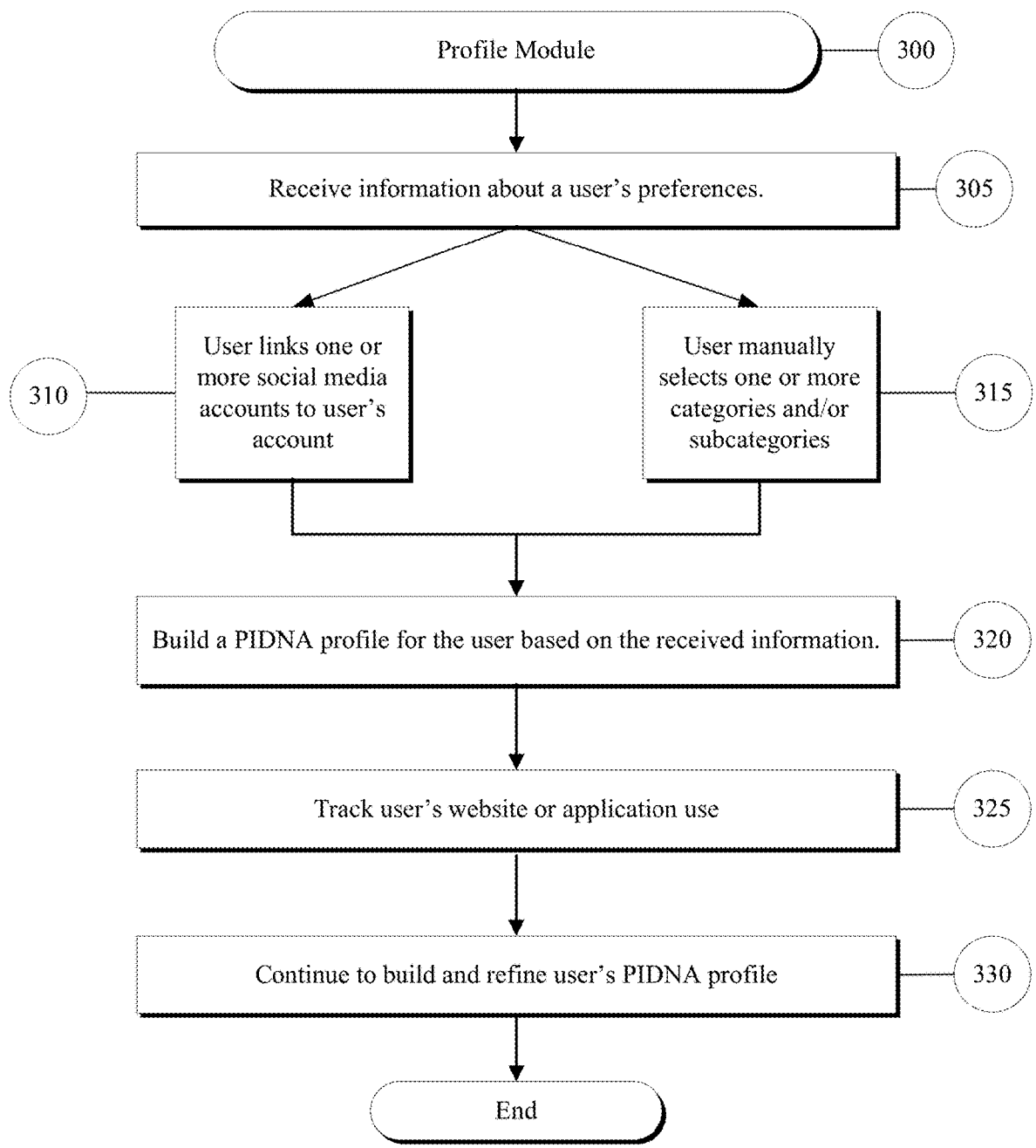
FIG. 3 depicts a flow chart that generally illustrates various steps executed by a profile module that, for example, may be executed by the PIDNA server of FIG. 1.

FIG. 3 is a flow chart of operations performed by an exemplary Profile Module 300, which may, for example, run on the PIDNA Server 120, or any suitable computing device (such as a suitable mobile computing device). In particular embodiments, the Profile Module 300 facilitates generating and refining a user's PIDNA profile.

The system begins, in various embodiments, at Step 305 by receiving information about a user's preferences. In particular embodiments, the user's preferences may be based on the user's interests (e.g., entertainment, news, sports, lifestyle, money, finance, weather, autos, homes, dating, jobs, shopping, health, style, beauty, food, movies, travel, business, technology, science, etc.). In particular embodiments, the user's preferences information will not include demographic information associated with the user (e.g., the user's name, address, age, race, etc.). In other embodiments, the user's preferences may contain demographic information. In some embodiments, the user's preferences information may include one or more behaviors associated with the user. For instance, the user's preferences information may include that the user reads articles related to a particular sport at least once a day.

The system may obtain the user's preferences in a multitude of ways. At step 310, once the user establishes an account on the system, the system, may prompt the user to link one or more social media accounts to the user's PIDNA system account. For example, the system may be configured to allow the user to link one or more of their FACEBOOK®, MYSPACE®, TWITTER®, LINKEDIN®, URBANSPOON®, etc. accounts to their system account. In various embodiments, the system may receive the user's preference information from a user's accounts on various websites or applications. In particular embodiments, the system may receive a user's log-in information and all user preferences associated with the user's log-in information for a particular web site or application. For instance, where the user has logged-on to a particular website such as URBANSPOON® or opened the URBANSPOON® application on their mobile phone, the website or application may request that the user link their account on the website or application with their PIDNA system account. In another example, the user's account on the PIDNA system may be linked to the user's account on a customized website publishing system as disclosed in U.S. patent application Ser. No. 14/476,800, filed on Sep. 4, 2014, and entitled "SYSTEMS AND METHODS OF PUBLISHING CONTENT FROM ONE OR MORE SOURCES," so that the topics of customized webpages created by the user may be integrated into the user's PIDNA profile. Once the user links the two accounts, whether through the PIDNA system or the website or application system, the PIDNA system may receive user preference information on cuisines that the user selects on the website or the application.

In various embodiments, once the user links one or more social media accounts, website accounts or application accounts to the user's PIDNA system account, the system examines the linked social media accounts using textual analysis and creates a histogram or frequency of keywords used or associated with the one or more social media accounts in order to find clusters of words of phrases and their relative importance based on their frequency—non-specific or trivial words or phrases (e.g. if, an, the, etc.) may be ignored. In particular embodiments, the system will build the PIDNA profile by associating the user's preferences (e.g., interests) with categories and/or subcategories. For example, in various embodiments the system may associate particular preferences with the categories of sports and news and then further divide the category of sports into subcategories such as golf, football, basketball, baseball, tennis, etc. For example, in various embodiments, the PIDNA system maps the clusters of words to associated categories and/or subcategories. For example, the PIDNA system may detect multiple uses of the words "dollar", "Yankees", "stock", and "Tiger Woods". The PIDNA system may map the word clusters "dollar" and "stocks" to the category "money/finance" and the word clusters "Yankees" and "Tiger Woods" to the category "sports". The word cluster "Yankees" may further be mapped to a subcategory "baseball" and the word cluster "Tiger Woods" may further be mapped to a subcategory entitled "golf". In addition to the keyword mappings, the PIDNA system examines the user's manual entries received at Step 315 and accounts for these entries when building the user's PIDNA profile.

At step 315, the system may instead of, or in addition to linking social media accounts, present the user with a list of categories to choose from that represent the user's preferences, interests, or disinterests. In various embodiments, when a category is chosen, the system may present one or more sub-categories that the user may select to further define the user's preferences (or interests). In various embodiments, the system may receive the manual input from the user from any suitable computing device. In some embodiments, the manual input from the user may include swiping a particular computing device's screen in a certain direction (e.g., up, down, left, right, etc.) when a category is displayed. For example, the system may receive an up-swipe from the user's computing device to indicate that the user is interested in a particular topic and a down-swipe to indicate that the user is not interested (e.g., disinterested) in a particular topic. In the alternative, the system may receive a right-swipe from the user's computing device to indicate that the user is interested in a particular topic and a left-swipe to indicate that the user is not interested in a particular topic. Furthermore, if the user is not interested or disinterested in the particular topic, in various embodiments the user may tap the screen to indicate that the user's feelings toward the topic are indifferent.

In other embodiments, the manual input from the user may include selecting a thumbs-up or a thumbs-down on a particular computing device's screen. For instance, the system may receive a thumbs-up from the user's computing device to indicate that the user is interested in a particular topic or a thumbs-down to indicate that the user is not interested in a particular topic. In still other embodiments, the system may receive the user's preferences information from a form filled out by the user. For example, the form may have checkboxes for interests such as entertainment, news, sports, lifestyle, money, finance, weather, autos, homes, dating, jobs, shopping, health, style, beauty, food, movies, travel, business, technology, science, etc. Using the form, the system could determine what the user is interested in based on the check marks, and what the user is disinterested in based on the user leaving one or more checkboxes blank. In various embodiments, the system may receive the user's preferences information from a series of questions presented to the user from which the system receives an answer from the user. For example, the system may ask the user whether the user is interested in sports, news, and weather and provide the user with the optional answers of yes, no, or maybe, where yes signifies the user is interested in a particular topic, no signifies the user is not interested in a particular topic, and maybe signifies the user may be interested in a particular topic.

In various embodiments, at Step 320, the system may build the PIDNA profile substantially automatically after receiving the user's preferences information. In particular embodiments, the system may build the PIDNA profile after receiving a request from the user to build the PIDNA profile. In some embodiments, the system may store the built PIDNA profile for the user and associate the PIDNA profile with the user's account on the PIDNA system. In various embodiments, the PIDNA profile includes the interests of the user. In other embodiments, the PIDNA profile includes the non-interests of the user. For example, where the user has indicated that the user is not interested in a particular topic, the profile may include this information. In particular embodiments, the PIDNA profile includes identifying information for a particular user to associate the PIDNA profile to the particular user. For instance, the identifying information may include a username and password associated with the particular user and/or the user's e-mail address.

Figure 9:
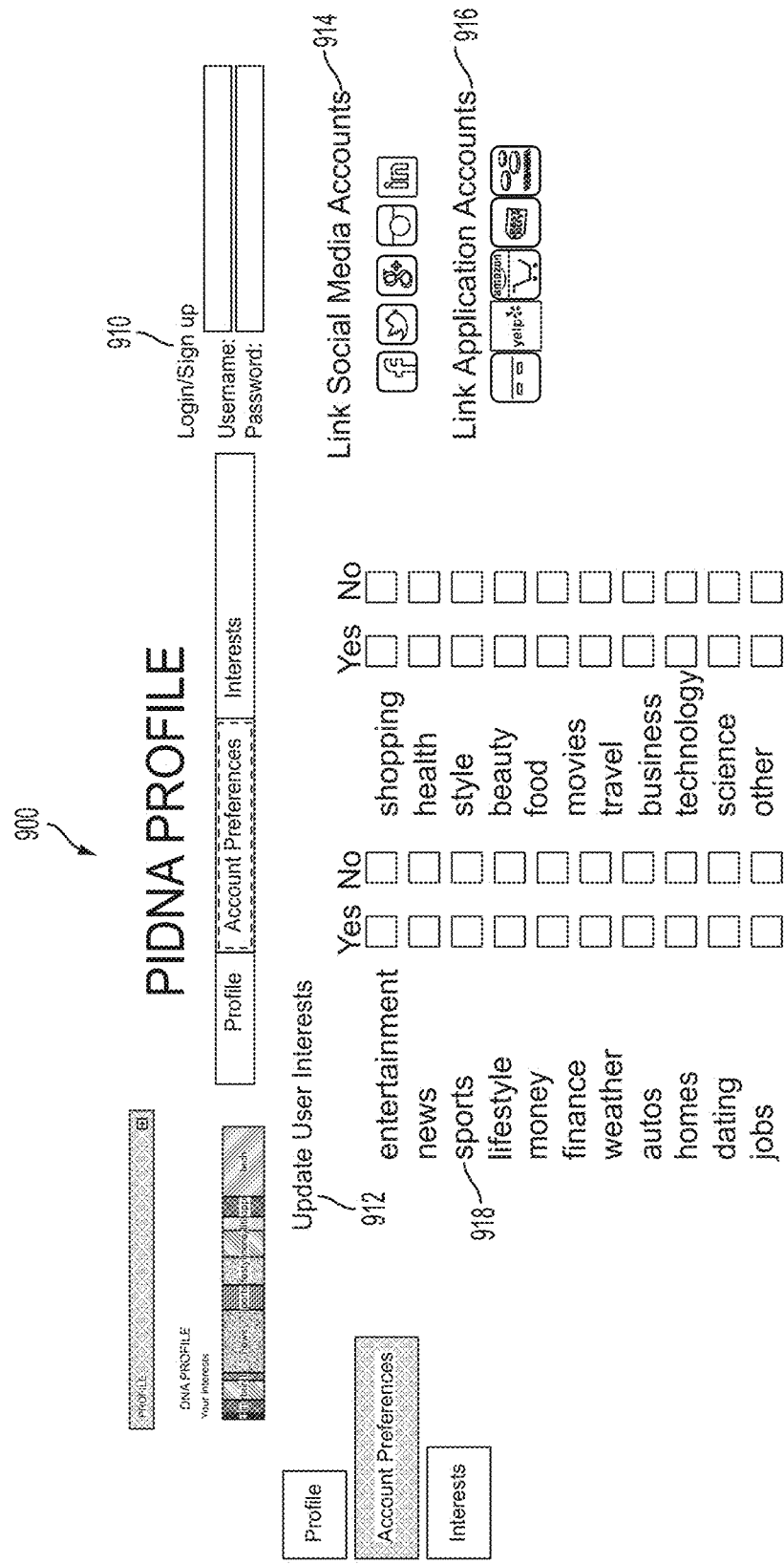
FIG. 9 is an exemplary management display of the system according to various embodiments.

Referring to FIG. 9, in various embodiments, the PIDNA system contains a management page 900 (e.g., an account user interface page) that allows the user to establish their account 910, update their preferences 912, link their PIDNA account to various social media accounts 914 and application accounts 916, etc. For instance, the management user interface may include all of the user's past interests, and the user may access the management user interface when the user manually updates the user's PIDNA profile. In various embodiments, the management user interface may allow a user to select a particular category, such as sports 918, to expand the category to include subcategories such as golf, football, basketball, baseball, tennis, etc. In some embodiments, the management user interface may be accessed via a web browser, via a mobile application or through the PIDNA application. In some embodiments, the management user interface may display a log of the websites, applications, and other third-party companies that have requested access to the user's PIDNA profile, the types of information requested by a particular website and/or application and the corresponding information that the PIDNA system provided the requester. In other embodiments, the management user interface may be configured to allow the user to set up profile access preferences (e.g., automatically providing access to the user's profile for certain third party requesters, requesting manual authorization for all requesters, etc.).

Referring again to FIG. 3, once the initial PIDNA profile is built in Step 320, at Steps 325, the PIDNA system tracks the user's website or application use and at step 330 the PIDNA system continues to build and refine the user's PIDNA profile by tracking activity of the user on the Internet or on applications (e.g., mobile applications, etc.). For instance, the system may track the user's clicks, the length of time spent looking at a particular webpage, a particular article or a particular image, the user's search terms, the user's purchases, and the websites visited by the user. In various embodiments, the system may track the user's activities on the internet by tracking the user's activities on the internet while using one or more of a mobile handheld computer, a smart phone, a desktop computer, and a tablet. In other embodiments, the system may receive the user's preferences information from a browser plugin provided to the user that is configured to capture information about the user's preferences and actions while using the browser. In still other embodiments, the system may receive information that the user enters into an account on a website or an account on a mobile application (e.g., URBANSPOON®, YELP®, AMAZON®, BESTBUY®, OPENTABLE®, etc.) that is linked to the user's account on the PIDNA system.

In particular embodiments, the system may receive updates to the user's preferences. In some embodiments, the system may receive updates to the user's preferences by monitoring the online activity of the user as described above. The system may then capture at least some of the online activity of the user and categorize the online activity similar to the earlier categorized preferences. In various embodiments, the system may substantially automatically update the user's profile after receiving the updates to the user's preferences. For example, once the system receives any changes or updates to the user's preferences, the system will automatically update the user's profile, which will allow the user's profile to be dynamic because it is continuously updated by the PIDNA system. In other embodiments, the system may receive a request manually entered by the user to update the user's profile after receiving the updates to the user's preferences. For example, the system may alert the user that updates are available to the user based on the user's preferences and request that the user select to update the user's profile.

In various embodiments, the PIDNA profile may be shown as a visual representation that may be embedded or overlaid on a website or graphical user interface for an application. In particular embodiments, the visual representation of the user's PIDNA profile may be shown in any suitable shape. In various embodiments, the representation may be in the shape of a bar that is divided into sub-bars that each represents a particular category, where the length of each subbar is proportional to the number of times a particular word occurs in a word cluster. In some embodiments, the size of each sub-bar of the representation is based on the number of times the user engaged in an activity related to the particular category associated with the sub-bar. In particular embodiments, the bar sections may visually represent a percentage of the user's total interests. For instance, where the user has equal interests in sports, news, weather, and travel, the four categories will each be depicted as an equal proportion of the total bar. In still other embodiments, the system may build a graphical representation of the user's preferences based on the subcategories of a particular category. For example, the system may build a bar that includes all of the users interests from which the user can select a particular category, such as sports, to expand to display a second graphical representation of the category sports subdivided into subcategories for sports, which may include subcategories such as golf, football, basketball, baseball, tennis, etc.

In other embodiments, the visual representation of the user's PIDNA profile may be represented by a double helix similar to DNA or as a series of rings where the width of any one ring is proportionate to the user's interest in the category associated with the ring. For example, where the user is more interested in sports than news, the width of the sports ring will appear larger than the width of the news ring.

In various embodiments, the system may include the name of the category on each subbar. In particular embodiments, the system may include the name of the category and subcategory on the graphical representation. In other embodiments, the system will include a portion of the name of the category or subcategory on the graphical representation. In particular embodiments, the system may color code the graphical representation such that each category is a different color and each subcategory is a shade or variation of the color of the category to which it belongs. For instance, the system may color code the category of sports as blue. In addition, the system may then color code a subcategory, such as golf a different shade of blue such as light blue. In other embodiments, the system may arrange the categories on the graphical representation in ascending or descending order based on what the user is most or least interested in.

Figure 4:
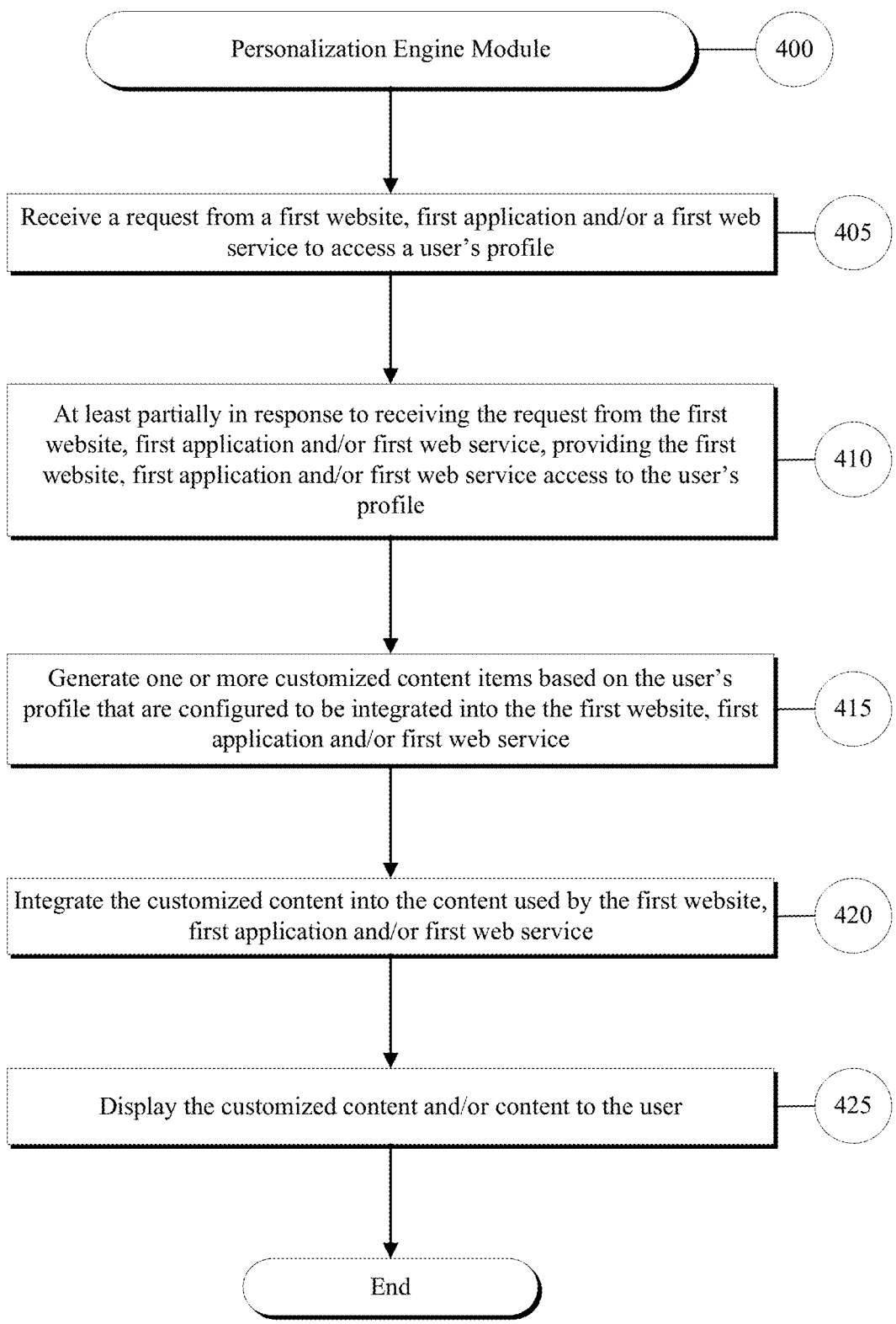
FIG. 4 depicts a flow chart that generally illustrates various steps executed by a personalization engine module that, for example, may be executed by the PIDNA server of FIG. 1.

FIG. 4 is a flow chart of operations performed by an exemplary Personalization Engine Module 400, which may, for example, run on the PIDNA Server 300A, or any suitable computing device (such as a suitable mobile computing device, a third party website server, an application server, etc.). In various embodiments, the PIDNA System 120 may only contain the Profile Server 300A that interacts with multiple third party Personalization Servers 400. In particular embodiments, the Personalization Engine Module 400 may facilitate generating customized content items on a website or application by obtaining access to the user's PIDNA profile and customizing the content based on the user's preferences, interests and/or disinterests.

The system begins, in various embodiments, at Step 405, where the system receives a request from a first website, a first application, a web service, etc. to access a user's profile. In some embodiments, the PIDNA system may receive a request to access one user's profile. In other embodiments, the PIDNA system may receive a request from the first website, the first application, the web service, etc. to access the user's profile in addition to a request to access at least one other user's profile. In various embodiments, the PIDNA system receives the request from the first website, the first application, the web service, etc. substantially automatically after the user accesses the first website, the first application, the web service, etc. In various embodiments, the first website, the first application, the web service, etc. may be a website, application, web service, etc. that requires the user to log into the first website, the first application, the web service, etc. before the user can access the contents of the first website, the first application, the web service, etc. In particular embodiments, the first website, the first application, the web service, etc. may be any suitable first website, application, web service, etc. seeking information about the user in an effort to customize the content provided to the user.

Continuing at Step 410, at least partially in response to receiving the request from the first website, the first application, the web service, etc., the PIDNA system provides the first website, the first application, the web service, etc. access to the user's PIDNA profile. In particular embodiments, at least partially in response to receiving the request from the first website, the first application, the web service, etc., the PIDNA system provides the first website, the first application, the web service, etc. access to the user's profile substantially automatically. In other embodiments, the PIDNA system may provide the first website, the first application, the web service, etc. access to the user's PIDNA profile based on predetermined settings set by the user. In particular embodiments, the system may provide the first website, the first application, the web service, etc. access after notifying the user that the first website, the first application, the web service, etc. is requesting access to the user's PIDNA profile. In particular embodiments, the system may notify the user that the first website, the first application, the web service, etc. is requesting access to the user's PIDNA profile by sending an email to the user. In other embodiments, the system may notify the users that the first website, the first application, the web service, etc. is requesting access to the users' PIDNA profile via a pop-up message, text message or any other suitable method of providing notification to the user.

In various embodiments, the PIDNA system may require the user to manually authorize access to the user's PIDNA profile based on individual preferences set by the user. For example, the PIDNA system may include a browser plug-in that the user installs in their local web browser. When the user navigates to a website that uses PIDNA profiles, the web browser notifies the user by opening a pop-up asking the user if the website can access the user's PIDNA profile. The user may allow access by clicking a "YES" button or deny access by selecting a "NO" button.

In other embodiments, the PIDNA system may be configured to notify the user of a PIDNA profile access request by sending the user an email or text notification that requests access to the user's PIDNA profile and that requires the user to click a link contained in the email or text message authorizing the first website or first application to access the user's PIDNA profile. In particular embodiments, user may change setting in the user's account on the PIDNA system that allows: (1) all requesting websites or applications access to the user's PIDNA profile or (2) no requesting websites or applications access to the user's PIDNA profile.

In particular embodiments, PIDNA system may provide the first website, the first application, the web service, etc. access to the user's PIDNA profile by providing the first website, the first application, the web service, etc. access to all or a part of the user's PIDNA profile. In various embodiments, the PIDNA system may provide the first website, the first application, the web service, etc. access to all information contained in the user's PIDNA profile. In particular embodiments, the PIDNA system may provide the first website, the first application, the web service, etc. access to only a portion of the user's PIDNA profile. For example, where the first website, the first application, the web service, etc. requesting access to the user's profile is a news website, the PIDNA system may provide the news website access to only the user's PIDNA profile information related to the category of news.

In various embodiments, the PIDNA system may be configured to provide the first website, the first application, the web service, etc. access to the user's PIDNA profile if the user receives a fee from the first website, the first application, the web service, etc. In particular embodiments, the fee may be set by the user. For instance, the user may set the fee to $0.01 USD for each websites to access the user's PIDNA profile. In another example, the website may set a predetermined payment amount for users whose profile matches a predefined profile established by the website by some fixed percentage. For example, the website may pay a user $10.00 USD to access the user's PIDNA profile if the user's PIDNA profile meets the requesting websites predefined profile by at least 70%. In other embodiments, the PIDNA system may provide the first website, the first application, the web service, etc. access to the user's PIDNA profile after receiving a fee from the user. For instance, the first website may require user's to pay a $0.01 USD fee for the first website to access the user's profile in order to customize the first website for the user.

The PIDNA system continues at Step 415 by generating one or more customized content items based on all or a portion of the user's PIDNA profile. The customized content items are configured to be integrated in, embedded in, or displayed by the first website, the first application, the web service, etc. In other embodiments, the customized content items are configured to be integrated in, embedded in, or displayed by the web service. For example, on a computer, the user may right click on a desktop, which causes the computer to open a specialized PIDNA menu that provides the user with various options to interact with the PIDNA system. One menu option may allow the user to select a link to the management user interface so the user can change account preferences, review profile request logs, etc. Another menu option may provide the user with a search box that allows the user to search the internet for particular content that can be customized based on the user's PIDNA profile.

In particular embodiments, the PIDNA system may generate the one or more customized content items as the graphical visualization of the user's profile and display the visualization to the user. In various embodiments, the one or more customized content items may be content displayed on a webpage associated with the first website. For example, the webpage may include articles that have been customized to include topics that would be of interest to the user based on the user's PIDNA profile. In particular embodiments, the one or more customized content items may be displayed in a widget that is associated with the website. In various embodiments, the one or more customized content items may be displayed on the first website using the browser plug-in. In some embodiments, the one or more customized content items may be displayed on a desktop or home screen of a computing device. In still other embodiments, the one or more customized content items may be displayed by an application as content that is customized to the user's taste. For example, in the case the URBANSPOON® application, the customized content may be one or more restaurants that serve food that the user likes based on the user's PIDNA profile. In yet other embodiments, the one or more customized content items may be sent to a third party server by a web service and then displayed by a browser. For example, as mentioned above, the user may enter a search for shoes using the specialized PIDNA menu on a computer. The search may be performed based on the user's PIDNA profile, which indicates that the user likes Jimmy Choo® shoes, Manolo Blahnik® shoes and likes to purchase shoes from Nordstrom's. Thus, once the search is submitted, a webpage for Nordstrom's may open that only shows Jimmy Choo® and Manolo Blahnik® shoes in the user's size.

In other embodiments, businesses or firms may interact with the PIDNA system 120 and conduct a search of PIDNA profiles to locate an individual or collection of people matching a very specific interest profile. The search results could list PIDNA profiles of users without other identifiable information such as names or address, thereby protecting basic privacy. Such a search may be accessible via a business or sponsor interface from a website or application.

In some embodiments, the system may generate one or more customized content items (e.g., to be integrated into the first website, the first application, the web service, etc.) based on the user's PIDNA profile and at least one other user's profile. In particular embodiments, in generating the one or more customized content items (e.g., articles, information, commerce items, services, applications or people, etc.), the system compares the user's PIDNA profile to the at least one other user's PIDNA profile. In comparing the user's PIDNA profile and the at least one other user's PIDNA profile, the system determines commonalities between the user's PIDNA profile and the at least one other user's profile. In some embodiments, after comparing the profiles, the PIDNA system suggests at least one customized content item to the user via the first website or first application. Where there is not an exact match, the suggested at least one customized content item may be a "best fit" compromise between the user's interests and the at least one other user's interests.

In particular embodiments, the at least one customized content item may be a name of a restaurant based on commonalities from the user's and the at least one other user's PIDNA profiles. In other embodiments, the at least one customized content item may be an activity (e.g., a sports game, a concert, a show, etc.) that would be appealing to the user and the at least one other user. In still other embodiments, the at least one customized content item may be whether the user and the at least one other user are compatible. For instance, the user and the at least one other user may be compatible based on similarities in business, social behavior, dating, etc. Thus, PIDNA profiles may be used by dating websites or applications that seek to match users based on commonalities in preferences, interests and other attributes that may be stored in the user's PIDNA profile.

In various embodiments, when customized content is not available to match the exact interests of the user, the system may provide customized content that is of a similar topic to one or more of the user's interests. For instance, if the user's profile indicates that the user is interested in golf, but the inventory of content available to the website does not include content on golf, the system may instead provide customized content for sports rather than for golf based on default rules in the user's PIDNA profile. In this way, of the user reads the presented content, the system may gather additional information about the user to update their profile and offer new content that matches actions by the user.

At step 420, the PIDNA system integrates the customized content into the first website or the first application. The customized content items may be embedded into a webpage on the website, integrated into a pop-up screen, overlaid on the webpage, integrated in an applet that is run by the website or integrated in any other method. In some embodiments, the system may generate a customized webpage based on preferences and interest of the user in the user's PIDNA profile. The generation of customized webpages are described in U.S. patent application Ser. No. 14/476,800, filed on Sep. 4, 2014, and entitled "SYSTEMS AND METHODS OF PUBLISHING CONTENT FROM ONE OR MORE SOURCES. In other embodiments, the customized content may be displayed as results in a mobile application. For example, when the user searches for a restaurant using a mobile application such as OPENTABLE®, the application may access the user's PIDNA profile to determine which restaurants satisfy the user's preferences and/or interests. Thus, the customized search results are displayed to the user by the mobile application alone, or in combination with other content.

In particular embodiments, the user's PIDNA profile may be used to customize content that the user sees on social media sites. For example, when a user reviews a twitter feed, the TWITTER® feed may be filtered using the user's PIDNA profile so that only TWEETS® from other user's having a similar PIDNA profile are displayed to the user. Moreover, TWEETS® that match interests of the user's PIDNA profile may also be shown instead of, or in addition to, TWEETS® from other user's with a similar PIDNA profile. For purposes of this disclosure, reference to a similar PIDNA profile may be based on an exact match, a match of some predefined percentage (e.g., a 60% similar PIDNA profile, etc.).

In various embodiments, the system, when executing the Profile Module 300 and the Personalization Engine Module 400, may omit particular steps, perform particular steps in an order other than the order presented above, or perform additional steps not discussed directly above.

Exemplary User Experience
Exemplary Graphical Display

Figure 5:
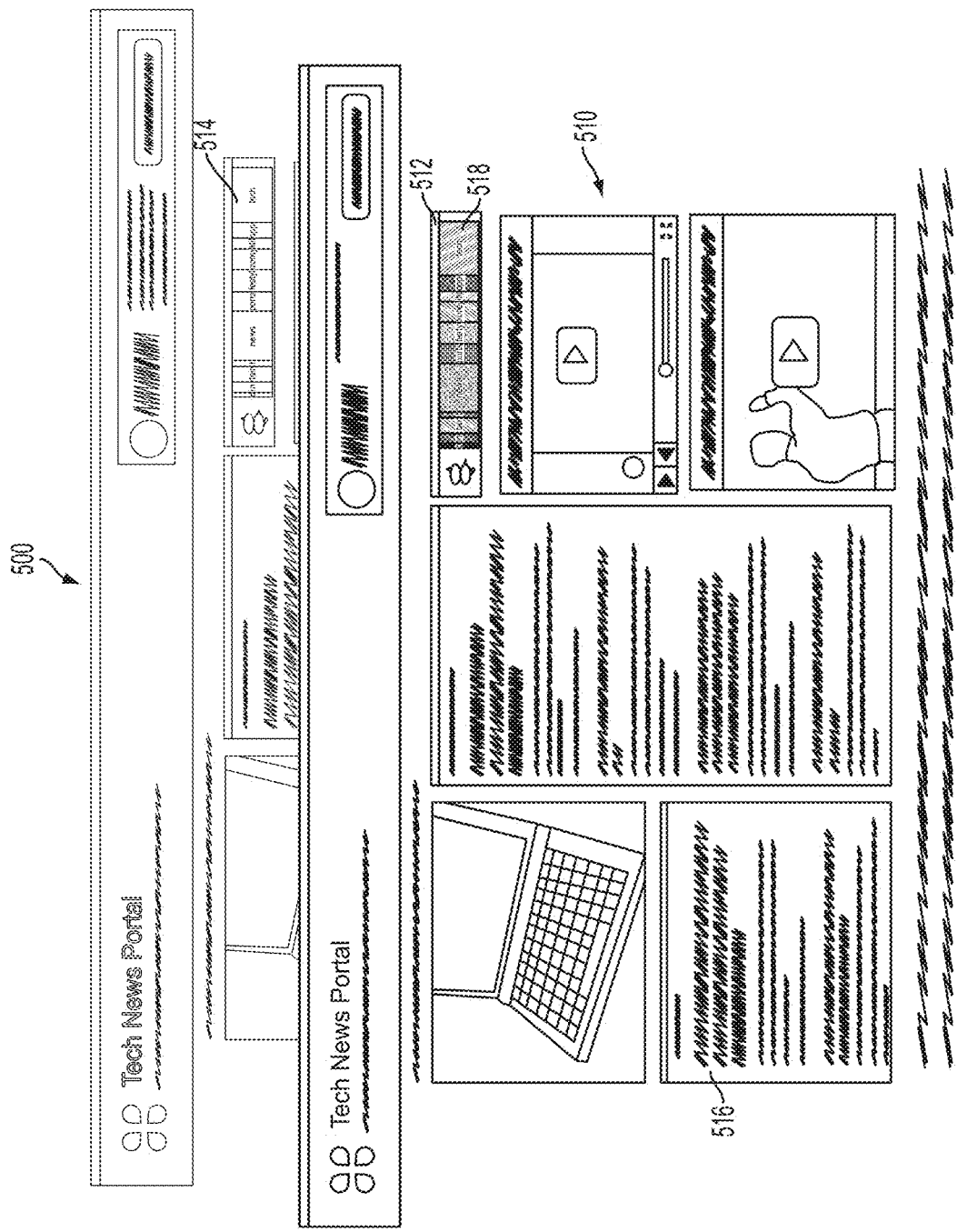
FIGS. 5-6 are exemplary screen displays of the system according to various embodiments.

FIG. 5 depicts an exemplary graphical display 500 of the user's PIDNA profile in the form of a subdivided bar that a user may encounter when using the Profile Module 300 and Personalization Engine Module 400. As may be understood from this figure, interests of the user may be divided and/or color-coded into sub-bars 510, 512, 514, and 518. In addition, each sub-bar portion of the graphical display 500 is sized proportionate to the user's interests. For example, because the user has a greater interest in technology than sports, the technology sub-bar portion 518 is larger than the sports sub-bar portion 510. In various embodiments, the system may receive from the user a selection of a particular sub-bar section of the graphical display 500 to customize the user's preferences related to that section. For instance, if the graphical display 500 depicts that the user is relatively uninterested in sports but the user is, in fact, very interested in sports, the user may select the sports sub-bar portion 510 to amend the user's preferences related to sports in the user's PIDNA system account.

In various embodiments, the graphical display 500 may also include other options for the user such as buttons to turn the graphical display on or off as explained in more detail below. The graphical display 500 may also include the option to change the appearance of the graphical display 500. For example, user may elect to have the graphical display 500 shown as a pie chart rather than the standard bar profile. In addition, PIDNA system may allow the user to change the colors associated with the various sub-bars of the graphical display 500. For instance, the user may want the news portion 514 to be red because the color red is likely to get the attention of the user.

Figure 6:
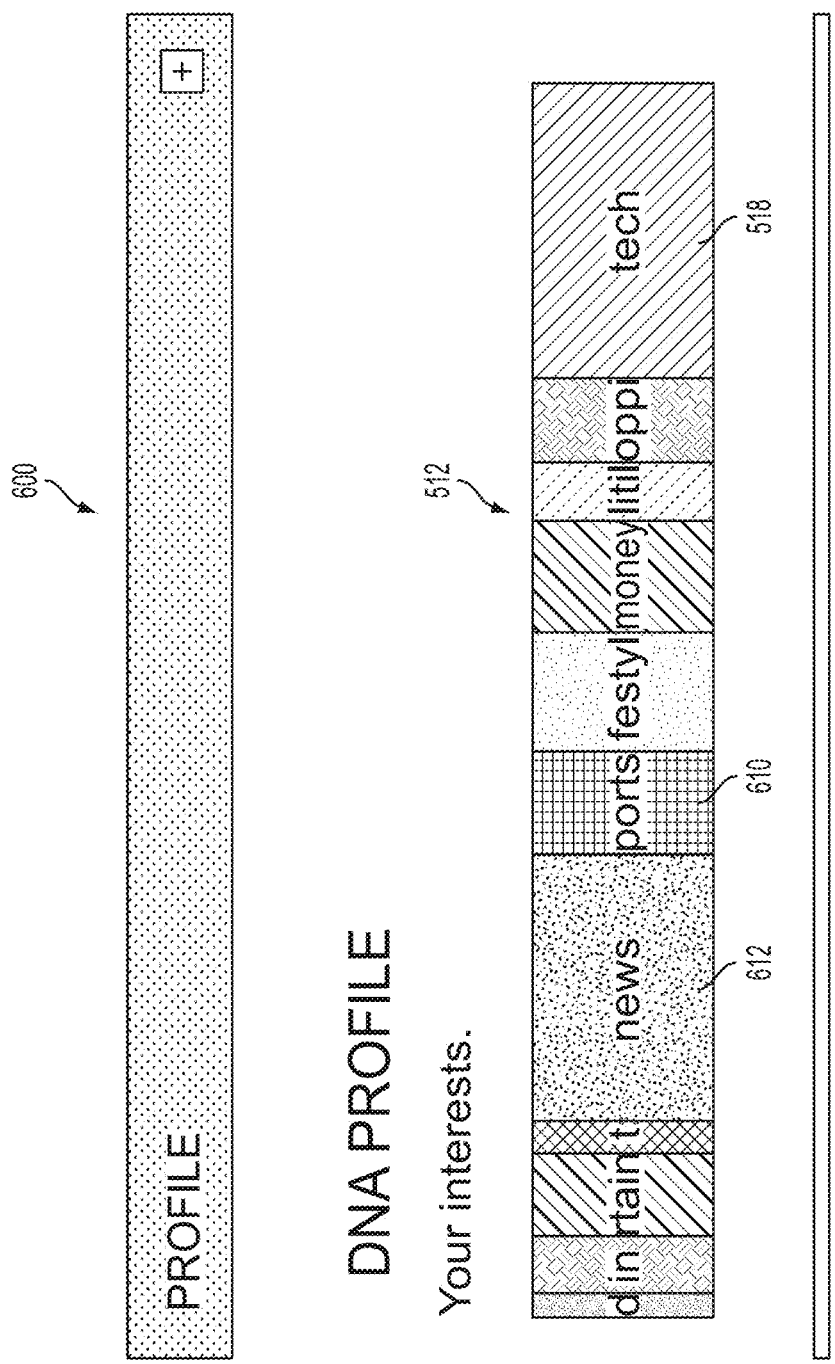

FIG. 6 depicts a website 600 having a graphical display that can be deactivated 612 or activated 614 embedded on the website 600. When the graphical display 500 is activated 612, the activated graphical display 612 appears in color. When the graphical display is deactivated 614, the deactivated graphical display 614 appears in grayscale. The user may switch between the activated graphical display 612 and the deactivated graphical display 614 by clicking on the graphical display 500. As may be understood from this figure, the activated graphical display 612 and the deactivated graphical display 614 may be embedded into a webpage 610, a user interface for an application (not shown) or overlaid over the webpage 610 or the application user interface in an applet or widget. When the user selects to use the activated graphical display 612, the webpage 610 displays articles 616 that relate to the user's preferences and/or interests. However, when the user selects to use the deactivated graphical display 614, the webpage 610 may display the same articles to the user that any other In various embodiments, when the user has selected the activated graphical display 612, the user may click on a sub-bar portion 618 of the graphical display 500 to show articles that relate to that particular sub-bar. For example, the user may select the green tech sub-bar portion 618 to view articles related to technology. As may be understood from this figure, because the user has an interest in technology, the tech sub-bar portion 618 of the graphical display 500 appears larger than the other sub-bar portions of the graphical display 500.

Figure 7:
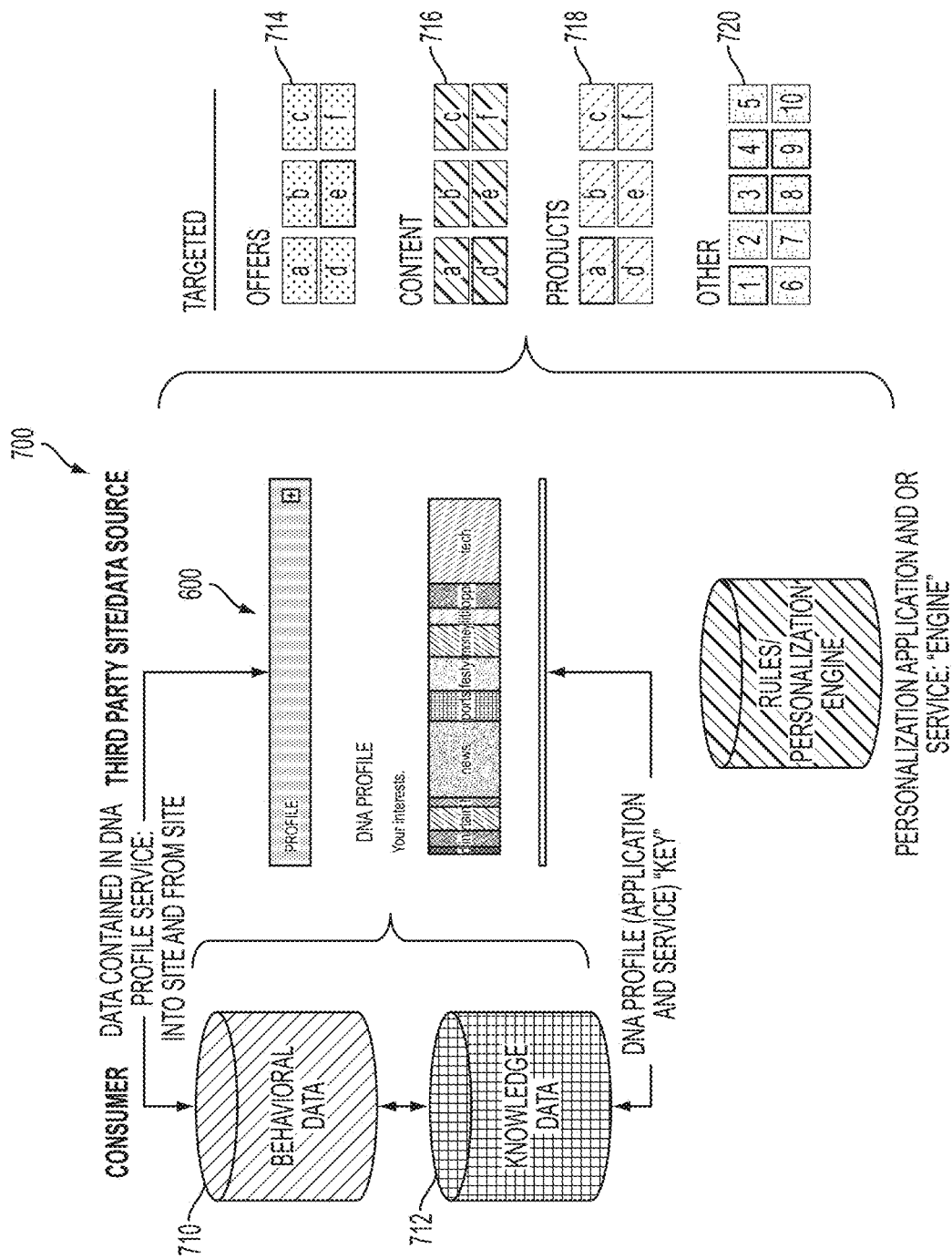
FIG. 7 is a schematic diagram of the system according to various embodiments.

Referring to FIG. 7, a schematic diagram of a third party site/data source 700 is depicted. As may be understood from this figure, Behavioral Data 710 and Knowledge Data 712 are collected by the PIDNA system to generate the graphical display 500 of a user's PIDNA profile. The system may then use the PIDNA profile information to provide the user with customized content data related to offers 714, content 716, products 718, and other data 720. That is, the PIDNA profile information is used by a personalization engine 722 that uses the user's preferences and/or interests in the PIDNA profile to determine particular offers 714, content 716, products 718, and other data 720 to present to the user. Thus, in some embodiments where the webpage is an e-commerce site (e.g., AMAZON®, etc.) the e-commerce site may rank particular technology products higher than household products if the user's PIDNA profile contains word clusters that are associated with technology. Furthermore, if a mobile application that allows users to search for restaurants is interacting with the user's PIDNA profile, the Personalization Engine 722 may rank Italian restaurants higher than other restaurants since the user's PIDNA profile contains preferences and interests associated with Italy.

Figure 8:
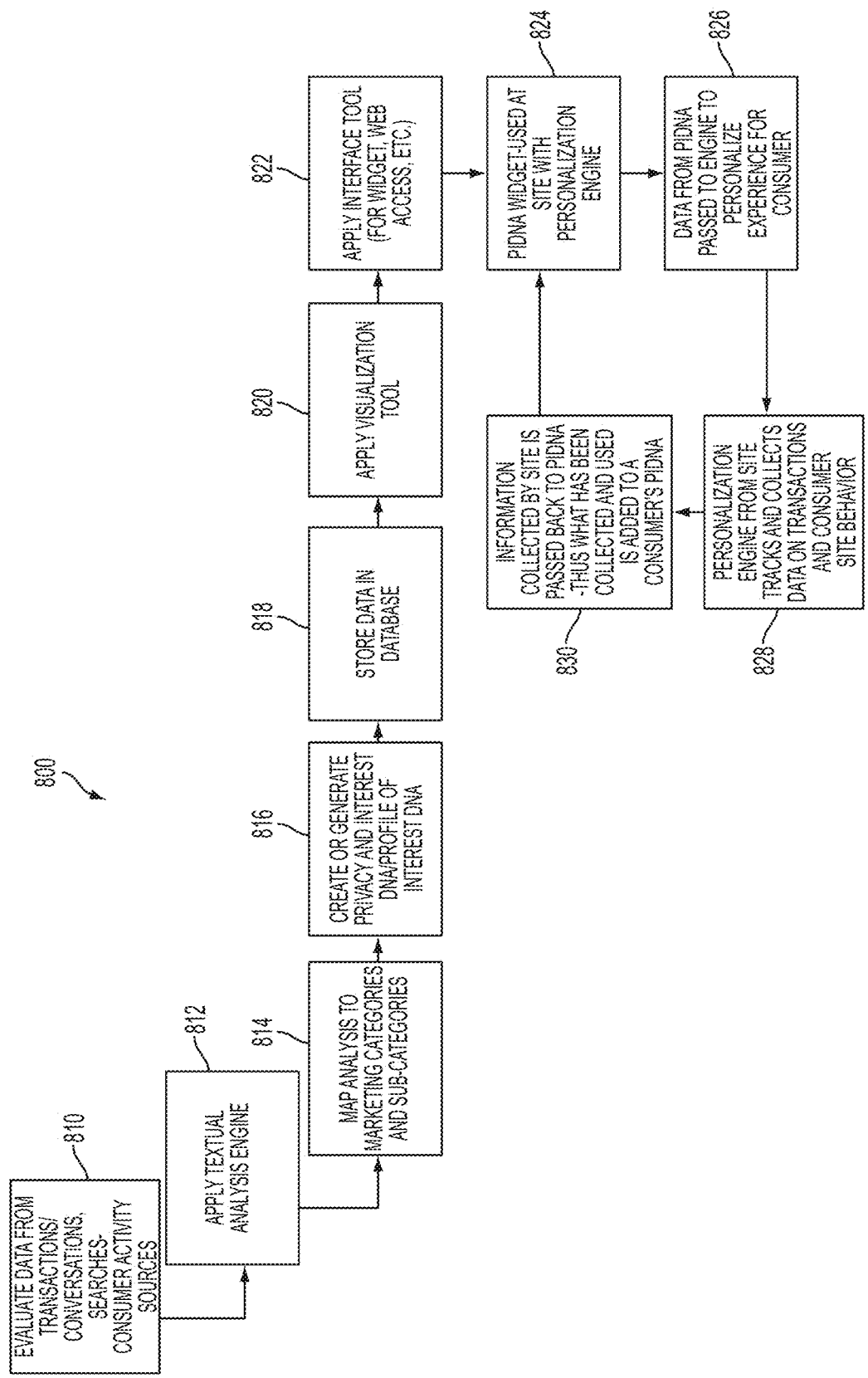
FIG. 8 depicts a flow chart that generally illustrates various steps executed by the PIDNA system.

FIG. 8 is a flow chart that illustrates an overview of various steps executed by the PIDNA system 800. As may be understood from this figure, the PIDNA system evaluates data, at step 810, such as transactions, conversations, and searches from consumer activity sources. The PIDNA system then applies a textual analysis engine to the data, at step 812. After applying the textual analysis, at step 814 the PIDNA system maps the analysis to marketing categories and subcategories and then creates or generates privacy and interest DNA (e.g., profile DNA), at step 816. At step 818, the PIDNA system stores the data in a database and applies a visualization tool to the data, at step 820. At step 822, the PIDNA system may also apply an interface tool such as a widget or web access to the data. The PIDNA system continues by using a PIDNA widget at the site with the Personalization Engine, at step 824. At step 826, the data from the PIDNA system may be passed to the Profile Engine to create a personalized experience for the consumer on a website or through an application. At step 828, using the Personalization Engine, the PIDNA system may track and collect data on the user's transactions and consumer site behavior, which may be sent back to the PIDNA system so that the user's PIDNA profile can be updated with new information, at step 830. The PIDNA system continues this process as a cycle by adding the collected data to the user's PIDNA profile so that the information in a user's PIDNA profile is updated and refined over time.

ILLUSTRATIVE EXAMPLES

Group Discount Application

In a particular example, the PIDNA system may be implemented to enable a group of users to connect to receive a group discount. The PIDNA system may also use the user's PIDNA profile to suggest particular coupons, offers, and events that match the user's preferences and/or interests. For example, the PIDNA system may use the location of a particular user to suggest offers nearby to the user. The PIDNA system may also use the location of another user with a user PIDNA profile to suggest offers that require more than one person to receive the benefits of the offer. In various embodiments, the system may connect two users that are geographically diverse to receive a group discount. In various embodiments, the user may opt in or out of receiving group discount notifications.

Group Meeting Application

In another illustrative application of the PIDNA system, the system may be utilized in a group setting such as dating, business, social, etc. to allow users with similar preferences and/or interests to meet or connect with one another. The PIDNA system may allow a user to specify that the user's PIDNA profile may be visible to all other users with PIDNA profiles. In various embodiments, the PIDNA system may allow a user to specify that the user's PIDNA profile may be visible to other users with similar interests in their PIDNA profile. The PIDNA system may also allow a user to specify that it does not want to be connected to other users with particular preferences and/or interests that are not included in the user's PIDNA profile as being of interest to the user. The PIDNA system may also suggest that two users connect based on the compatibility of their respective PIDNA profiles.

Group Aggregation Recommendations Application

In yet another illustrative application, the system may aggregate users' PIDNA profiles to generate a recommendation to the users based on commonalities between the users' PIDNA profiles. The system may compare users' PIDNA profiles using a percentage of similarity where an exact match is not possible. For instance, where the users PIDNA profiles have similarities in 70% of the users' interests, the system may determine that the users' PIDNA profiles are similar. The users may opt into the group aggregation recommendation application by sending a "hashtag character" (e.g., #hashtag) from the users' phones to join a particular group. For instance, where a group of users wants to go out to dinner together, a first user may open an OPENTABLE® application on their mobile phone. The application may be linked to the user's PIDNA system account. Thus, the user may select an option in the application that allows the application to make recommendations of places to eat based on one or more user's PIDNA profile. The application first provides a #hashtag for everyone in the group to text using their cellphones. Once the two or more users text the unique group #hashtag to the PIDNA system, the system compares the users' PIDNA profiles to determine commonalities for the various group users. For example, the system may determine that everyone or a majority of users would prefer to eat German food. The application would then use this information for making customized recommendations for a restaurant that would likely satisfy everyone in the group. In some embodiments, the application may list only restaurants that satisfy the commonality of all users or the majority of users. In other embodiments, the application would rank the customized recommended restaurants first and then other restaurants below the customized content. The users may also aggregate user profiles for any other suitable reason such as for engaging in political protests, attending events, finding nearby activities, etc.

CONCLUSION

Many modifications and other embodiments of the invention will come to mind to one skilled in the art to which this invention pertains, having the benefit of the teaching presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

The invention claimed is:

1. A computer-implemented method of providing secure and customized information comprising:
   establishing a first secure user profile in a computer server that is inaccessible to third party websites, third party applications or third party web media services unless allowed access by a first user;

receiving first user interests of the first user comprising two or more interests obtained by tracking first activities of the first user on at least one of: one or more first websites, one or more first applications, or one or more first web services, interests obtained manually from the first user, and interests obtained from at least one first social media account of the first user;

building the first user profile from the received first user interests, wherein the building includes receiving first user input selectively indicating first permitted interests of the first user profile and indicating first excluded interests of the first user profile so that the built first user profile comprises:
  first permitted interests of the first user profile accessible to at least one of: one or more third party websites, one or more third party applications, or one or more third party web media services, and
  first excluded interests of the first user profile inaccessible to the at least one of the one or more third party websites, the one or more third party applications, or the one or more third party web media services;

establishing a second secure user profile in a computer server that is inaccessible to third party websites third party applications or third party web media services unless allowed access by a second user;

receiving second user interests of a second user comprising two or more of interests obtained by tracking second activities of the second user on at least one of: one or more second websites, one or more second applications, or one or more second web services, interests obtained manually from the second user, and interests obtained from at least one second social media account of the second user;

building a second user profile from the received second user interests, wherein the building includes receiving second user input selectively indicating second permitted interests of the second user profile and indicating second excluded interests of the second user profile so that the second built user profile comprises:
  second permitted interests of the second user profile accessible to the at least one of one or more third party websites, the one or more third party applications, or the one or more third party web media services, and
  second excluded interests of the second user profile inaccessible to the at least one of the one or more third party websites, the one or more third party applications, or the one or more third party media services;

analyzing the first permitted interests, the first excluded interests, the second permitted interests, and the second excluded interests of the first and second user profiles to determine those common permitted interests of the first user and the second user that are accessible to the at least one of one or more third party websites, the one or more third party applications, or the one or more third party media services;

enabling access to the accessible common permitted interests of the first and second users to the at least one of one or more third party websites, the one or more third party applications, or the one or more third party web media services; and presenting to each of the first user and the second user browsing one of the third party websites, one of the third party applications, or one of the third party web media services customized information from one of the third party websites, one of the third party applications, or one of the third party web media services, the customized information being customized according to the accessible common permitted interests of the first user and the second user, wherein the customized information presented to the first user and to the second user is in response to a match request from the first and the second users who are browsing one of the third party websites, one of the third party applications, or one of the third party web media services to search for a match between permitted interests of the first and second user profiles.

2. The computer-implemented method of claim 1, further comprising:
  receiving a request from the first user and the second user to create a group; and
  creating the group.

3. The computer-implemented method of claim 2, wherein receiving the request to create the group further comprises:
  receiving from the first user a hashtag character and from the second user the hashtag character; and
  creating the group consisting of the first user and the second user based on the hashtag character.

4. The computer-implemented method of claim 1, wherein the common interests satisfy at least 70% of the first user interests and the second user interests.

5. The computer-implemented method of claim 1, wherein the customized information further comprises one or more recommendations selected from among:
  restaurant recommendations;
  activity recommendations;
  connection recommendations; and
  coupon recommendations.

6. The computer implemented method of claim 5, wherein the first and second users browse a restaurant web application, and submit their respective first and second user profiles to the restaurant web application, and wherein the customized information received by the first and second users is a restaurant that is based on a match between the common interests of the first and second user profiles.

7. The computer implemented method claim 6, wherein the restaurant web application is a web application for making reservations at restaurants.

* * * * *